Dec. 31, 1957    C. E. PEELE ET AL    2,818,031
AUTOMATIC MEAT HOOK ASSEMBLY HOLDER

Filed April 2, 1954

INVENTORS
Charles E. Peele &
Escoe H. Peele
BY Victor J. Evans & Co.

ATTORNEYS

United States Patent Office 2,818,031
Patented Dec. 31, 1957

2,818,031

AUTOMATIC MEAT HOOK ASSEMBLY HOLDER

Charles E. Peele and Escoe H. Peele, Greensboro, N. C.

Application April 2, 1954, Serial No. 420,692

6 Claims. (Cl. 104—93)

This invention relates to meat hook assemblies for use in moving large pieces of meat from one location to another, as for example in meat packing companies.

The object of the invention is to provide a holder which will selectively receive a meat hook roller assembly as it moves to a predetermined point along a conveyor rail whereby the meat hook roller assembly will be held stationary while the meat is being removed therefrom or hooked thereon.

Another object of the invention is to provide an automatic meat hook assembly holder which is adapted to be connected to a conveyor rail in such a way as to permit a roller assembly to roll into it so that when the roller assembly has reached a predetermined position a locking keeper is triggered in order to catch and hold the roller assembly stationary so that one man can lift meat from the hook without the roller assembly accidentally moving.

A further object of the invention is to provide an automatic meat hook assembly holder which is extremely simple and inexpensive to manufacture.

Other objects and advantages will be apparent during the course of the following description.

In the accompanying drawings, forming a part of this application, and in which like numerals are used to designate like parts throughout the same:

Figure 1:
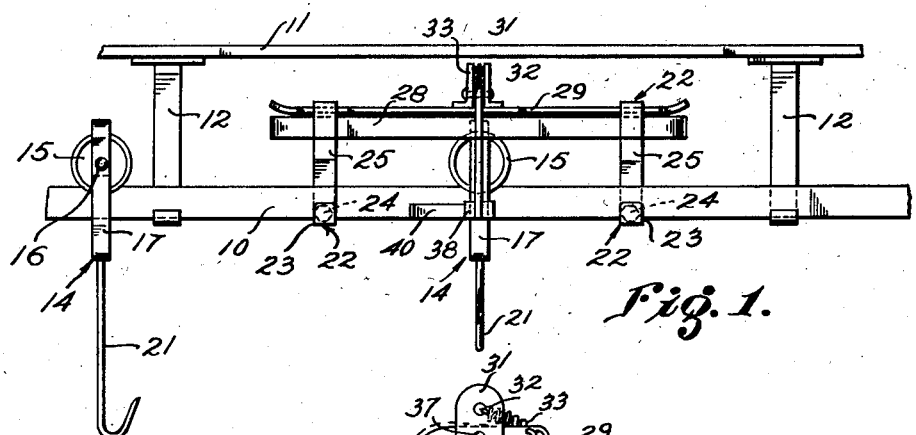
Figure 1 is a side elevational view showing a portion of a conveyor roller and with the holder of the present invention mounted thereon.

Referring in detail to the drawings, the numeral 10 designates a conveyor rail or track which is adapted to be suspended or supported by brackets 12 which can be secured to the ceiling 11, Figure 1. Movably mounted on the rail 10 is a plurality of roller assemblies 14 which each have the same construction. Each of the roller assemblies 14 includes a grooved roller 15 that engages the upper surface of the rail 10. A body member includes arms 17 and 18 which are connected to the roller 15 by means of a pin 16, and the arms 17 and 18 are interconnected together by a straight portion 19, Figure 2. The lower end of the arm 17 terminates in a horizontally disposed lip or flange 20, and a hook 21 is connected to the lip 20. The hook 21 is adapted to support a large piece of beef, pork or the like whereby such pieces of meat can be readily transported from one location to another as for example in a meat packing plant.

Figures 4, 5:
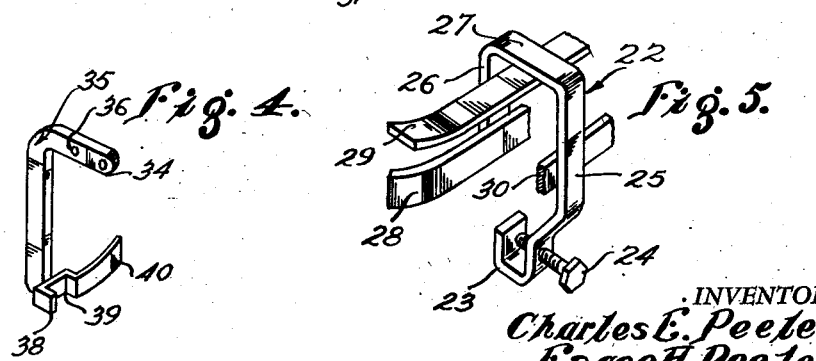
Figure 4 is a perspective view of a part of the holder showing the L-shaped finger and keeper.
Figure 5 is a fragmentary perspective view showing a portion of the holder.

The present invention is directed to a means for holding the roller assemblies 14 in a predetermined location so that one man can unhook a piece of meat from the hook 21. This holding means comprises a housing spaced above the rail and about the path of travel of the roller assemblies on the rail. The housing includes a pair of support members 22 which have the same construction, and the support members 22 are arranged in spaced parallel relation with respect to each other and are mounted on the rail 10. Each of the support members 22 is shaped to include a lower clamp portion 23, Figure 5, and the clamp portions 23 receive or engage the lower portion of the rail 10. A set screw or bolt 24 is provided for clamping the support members 22 to the rail 10. Each support member 22 further includes a pair of spaced apart leg portions 25 and 26 which are interconnected together by a horizontally disposed web 27, and in constructing the support members 22 these parts can be made of a single piece of suitable material such as iron or steel.

Extending between the legs 26 of the support members 22 and secured thereto is a first bar 28, and extending between the legs 25 and secured thereto in any suitable manner as for example by welding, is a similar bar 30. A top piece 29 extends between the webs 27 of the two support members, and the top piece 29 may be secured to these webs in any suitable manner. The top piece 29 and bars 28 and 30 serve as guide means for limiting vertical and lateral movement of the roller assemblies within the housing. Means are also provided within the housing for restraining successive roller assemblies against longitudinal movement in either direction relative to the rail 10. The restraining means may include a pair of spaced parallel ears 31 projecting upwardly from the top piece 29 and arranged intermediate its ends. A pin 32 projects through the pair of ears 31, and a coil spring 33 has one end connected to the pin 32. The other end of the coil spring 33 is arranged in engagement with an aperture 34 in an L-shaped finger 35, Figure 4. The upper end of the L-shaped finger 35 is provided with a second aperture 36, and a pivot pin 37 extends through the ears 31 and through the aperture 36 whereby the finger 35 can pivot about the pin 37.

Secured to the lower end of the finger 35 is a keeper 38, and the keeper 38 is provided with a recess 39 for receiving therein the arm 17 of the roller assembly 14. Projecting from the keeper 38 is a curved trigger member 40. The trigger member 40 is adapted to be engaged by the arm 17 as the roller assembly 14 advances along the rail 10 in order to pivot the finger 35 from the solid line position shown in Figure 2 to the dotted line position of Figure 2 so that the roller assemblies will be automatically released and held in the recess 39.

From the foregoing it is apparent that there has been provided a device for holding a roller assembly 14 immobile while the meat is removed by one man from the hook 21. In use the roller assemblies 14 may move from left to right along the rail 10 as shown in Figure 1 and when the roller assemblies 14 reach the trigger 40, the arm 17 will actuate the trigger 40 to thereby pivot the finger 35 from the solid line position shown in Figure 2 to the dotted line position shown in Figure 2 and this will permit the arm 17 to move along and be received in the recess 39 in the keeper 38. After the arm 17 registers with the recess 39, the coil spring 33 will return the finger 35 from the dotted line position of Figure 2 to the solid line position of Figure 2 so that the arm 17 will be retained in the recess 39 whereby accidental movement of the roller assemblies 14 along the rail 10 will be prevented. Then, when the next roller assembly 14 moves into position along the rail 10, the trigger 40 will again be engaged by the arm 17 on the next roller assembly to thus pivot the finger 35 in a direction to permit the empty roller assembly to move along so that succeeding hook roller assemblies 14 can be held in position while they are being emptied of their cargo. The bolts 24 retain the support members 22 in place on the rail 10, and the pair of support members 22 are interconnected together by means of the bars and top piece.

Figure 2:
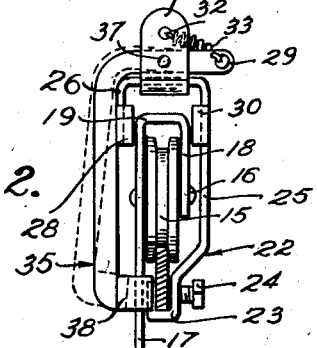
Figure 2 is an end elevational view of the present invention, and showing the conveyor rail in section.
Figure 3:
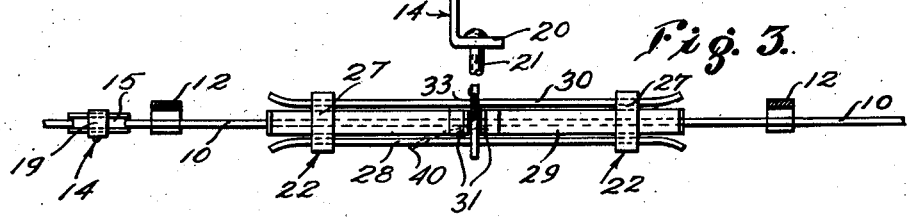
Figure 3 is a top plan view of the present invention and showing the brackets for supporting the rail in section.

The coil spring 33 serves to normally maintain the parts in the solid line position of Figure 2, but when sufficient pressure is exerted on the trigger 40 by means of an arm 17 of a roller assembly, the finger 35 can pivot against the tension of the coil spring. The ends of the bars 28 and 30, and the ends of the top piece 29 are bent outwardly and upwardly in order to slide the roller assembly into the proper space for engagement with the trigger.

The present invention is especially suitable for use in meat packing companies wherein a rail such as the rail 10 is suspended from the ceiling or other structure 11 and the roller hook assemblies 14 are used for moving heavy pieces of meat from one location to another in the storage rooms. Ordinarily, when the meat, that is the hind or fronts or other pieces of the meat are removed from the hooks 21, two men are required for the operation since one man must lift the meat and another man must hold the roller hook assembly 14 on the rail 10 to prevent the assembly from falling and accidentally coming out of the meat. The present invention is an automatic meat hook assembly holder which is secured on the rail 10 in such a way as to permit the roller hook assembly 14 to roll into it. When the roller hook 14 reaches the trigger 40, the finger 35 will be pivoted and the arm 17 will subsequently be received in the recess 39 so that the roller assembly will be held securely. After the meat has been removed from the hook 21, the next loaded hook assembly 14 can be rolled in to automatically release the empty hook assembly 14 and the next roller assembly will be latched by the automatic keeper 38. Thus, with the present invention one man can accomplish the same operation that ordinarily takes two men.

We claim:

1. In combination with a track having a plurality of roller assemblies thereon, each of said roller assemblies comprising a bracket and a wheel journaled in said bracket; means for automatically entrapping and releasing successive roller assemblies at a predetermined point along said track comprising an elongated housing spaced above said track and about the path of travel of the roller assemblies, said housing including guide means for limiting lateral and vertical movement of said roller assemblies within said housing, a spring pressed keeper carried by said housing and normally urged toward said track and into the path of the roller assemblies, said keeper having a groove therein adapted to register with the bracket of successive roller assemblies whereby longitudinal movement of successive roller assemblies relative to said track is limited, a trigger extending from said keeper longitudinally of said track and disposed in the path of approaching roller assemblies in advance of the keeper, and said trigger being movable by successive roller assemblies to move said keeper away from said track and out of the path of the roller assemblies to release a preceding roller assembly from said groove.

2. Apparatus for automatically entrapping and releasing successive trolleys at a predetermined point on a rail upon which a plurality of trolleys are mounted, said apparatus comprising a housing extending longitudinally of said rail about the path of travel of the trolleys, said housing having an ingress opening and an egress opening at opposite ends thereof and including guide means to limit lateral and vertical movement of said trolleys within the housing, a spring biased trigger carried by the housing and normally urged toward said rail, one end portion of said trigger being of generally arcuate configuration and extending longitudinally of said rail toward the ingress opening in the path of said trolleys, the free end of said one end portion being spaced from said ingress opening and being spaced further from said rail than the medial portion thereof, said medial portion being slidably engageable by successive trolleys to move said trigger away from said rail, and said trigger having a notch formed in the end thereof adjacent said egress opening releasably engageable with successive trolleys for limiting longitudinal movement thereof in either direction relative to said rail.

3. A structure according to claim 2 wherein said notch in said trigger communicates with the medial portion of the trigger so that a first trolley entrapped by said notch will be engaged by a succeeding trolley at the same time said succeeding trolley slidably engages said medial portion to move said trigger away from said rail whereby said first trolley will be moved along said rail toward said egress opening to permit said succeeding trolley to enter said notch.

4. In combination with a rail having a plurality of roller assemblies mounted thereon and each of said roller assemblies including a bracket and a wheel journaled in the bracket for rotation along the rail, means for automatically entrapping and releasing successive trolleys at a predetermined point along the rail comprising guide means spaced from the rail, and having an ingress opening and an egress opening, a vertically disposed keeper pivotally connected to said guide means at a point between the ingress opening and the egress opening, said keeper extending therefrom to a point adjacent said rail, spring means normally urging the free end of the keeper adjacent the rail into the path of successive roller assemblies, said keeper having a vertically extending notch in its free end and the notched free end of the keeper being engageable with successive roller assemblies to successively entrap said roller assemblies, and a trigger connected to the notched portion of the keeper in communication with the notch and extending therefrom longitudinally of the rail toward the ingress opening, the end portion of the trigger adjacent its juncture with the keeper being disposed in the path of the roller assemblies and said trigger flaring away from the keeper so the end of the trigger remote from the keeper is disposed out of the path of the roller assemblies.

5. In combination with a rail having a plurality of roller assemblies thereon; restraining means for automatically entrapping successive roller assemblies at a predetermined point along said rail, resilient means normally urging the restraining means into the path of the roller assemblies to entrap them at said predetermined point, release means operatively connected to the resilient means and disposed in the path of the roller assemblies in advance of the restraining means for engagement by successive roller assemblies, whereby engagement of the release means by one roller assembly will overcome the resilient means to move the restraining means out of the path of a preceding roller assembly.

6. In a conveying system having a rail and a plurality of roller assemblies adapted to be moved about thereon and having a housing to receive successive rollers assemblies therein and prevent their displacement from the rail during a loading and unloading operation, the combination therewith of restraining means within the housing for automatically limiting longitudinal movement of successive roller assemblies within the housing, resilient means normally urging the restraining means into the path of the roller assemblies to entrap them within said housing, release means operatively connected to the resilient means and disposed in the path of the roller assemblies in advance of the restraining means for engagement by successive roller assemblies, whereby engagement of the release means by one roller assembly will overcome the resilient means to move the restraining means out of the path of a preceding roller assembly.

References Cited in the file of this patent

UNITED STATES PATENTS

| | | |
|---|---|---|
| 1,060,227 | Bowers | Apr. 29, 1913 |
| 1,778,332 | Meyer | Oct. 14, 1930 |
| 2,416,473 | Fields | Feb. 25, 1947 |
| 2,566,962 | Ramsey | Sept. 4, 1951 |
| 2,581,948 | Flounders | Jan. 8, 1952 |